US007855961B2

(12) United States Patent
Peloso et al.

(10) Patent No.: US 7,855,961 B2
(45) Date of Patent: Dec. 21, 2010

(54) METHOD FOR CONTROLLING THE ESTABLISHMENT OF A CONNECTION IN AN OPTICAL NETWORK

(75) Inventors: Pierre Peloso, Velizy (FR); Benoit Ronot, Velizy (FR); Cedric Vandenweghe, Nozay (FR)

(73) Assignee: Alcatel-Lucent, Paris (FR)

( * ) Notice: Subject to any disclaimer, the term of this patent is extended or adjusted under 35 U.S.C. 154(b) by 39 days.

(21) Appl. No.: 12/321,719

(22) Filed: Jan. 23, 2009

(65) Prior Publication Data
US 2009/0190497 A1 Jul. 30, 2009

(30) Foreign Application Priority Data
Jan. 29, 2008 (FR) .................................. 08 50528

(51) Int. Cl.
*G01R 31/08* (2006.01)
(52) U.S. Cl. ..................................... 370/231; 370/395.2
(58) Field of Classification Search ....................... None
See application file for complete search history.

(56) References Cited

U.S. PATENT DOCUMENTS

| 5,519,704 | A | * | 5/1996 | Farinacci et al. | ............ 370/402 |
| 2005/0030951 | A1 | * | 2/2005 | Maciocco et al. | ........ 370/395.2 |
| 2005/0105470 | A1 | * | 5/2005 | Lazzeri et al. | ............... 370/237 |
| 2005/0185621 | A1 | * | 8/2005 | Sivakumar et al. | .......... 370/335 |

* cited by examiner

*Primary Examiner*—Robert W Wilson
(74) *Attorney, Agent, or Firm*—Carmen Patti Law Group, LLC

(57) ABSTRACT

A method for controlling the establishment of a connection within an optical network comprising the steps consisting in: transmitting a control message node-to-node along a path of said connection from an input node (A) to an output node (D) of the connection, said control message comprising a step indication field to indicate a current step (60) of the connection establishment, performing a local operation (62, 63) corresponding to said step indication field within at least one node, transmitting a step acknowledgment to the connection's input node after having completed said local operation, in response to receiving the step acknowledgment, transmitting another control message node-to-node from the input node, wherein said step indication field indicates a following step (70) within a sequence of steps.

12 Claims, 3 Drawing Sheets

FIG_1

FIG_2

METHOD FOR CONTROLLING THE ESTABLISHMENT OF A CONNECTION IN AN OPTICAL NETWORK

DETAILED DESCRIPTION

The invention pertains to the field of optical networks, in particular the field of transparent optical networks, which are capable of switching signals to photon-based signals in order to establish optical connections between elements of remote networks.

Within optical networks, there is an increasing need for bandwidth, resource use flexibility, and management of service quality. Various manufacturers have sought to meet these needs using automatically switched optical networks (ASONs). However, due to the particulars of each network management system, these proprietary solutions are difficult to combine and integrate within a heterogeneous network. GMPLS (Generalized Multi-Protocol Label Switching) distributed control plane optical networks lay the foundations for a unified control plane for controlling heterogeneous networks. In these networks, the data is transported using connections, also known as Label-Switched Paths (LSP).

One goal of the invention is to provide a reliable method for controlling the establishment of an optical connection within an optical network.

To do so, the invention provides a method for controlling the establishment of a connection within an optical network, said connection establishment comprising a sequence of steps that must be performed in succession, characterized by the fact that said method comprises the steps consisting in:

transmitting a control message node-to-node along a path of said connection from an input node to an output node of the connection, said control message comprising a step indication field to indicate a current step of the connection establishment, performing a local operation corresponding to said step indication field at least one node along the path of the connection in response to receiving said control message, transmitting a step acknowledgment from said at least one node to said input node of the connection after having completed said local operation corresponding to the step indication field, in response to receiving said acknowledgment of said at least one node, transmitting another control message node-to-node along the path of the connection from the input node to the output node of the connection, wherein said step indication field indicates a following step within said sequence of steps as the current connection establishment step.

According to one particular embodiment, the connection's output node transmits this acknowledgment within a control message that must be transmitted node-to-node along the path of the connection all the way to the input node, said control message comprising the step indication field to which the step acknowledgment corresponds, each node along the connection's path transmitting said control message to the following node after having completed the local operation corresponding to the step indication field.

The acknowledgment may be in the form of implicit or explicit information, whose level of detail may vary, within the control message. For example, a node of the connection path may be programmed to interrupt the transmission of the control message traveling towards the input node if the local operation should fail. In this manner, the input node receiving the control message comprising the step indication field at least implicitly serves as a step acknowledgment for all nodes, without any need for additional information to be made explicit within the message. However, it is also possible to include explicit information within the control message, for example success/failure logical indicators, which may be detailed node-by-node and/or suboperation-by-suboperation, or which may, contrariwise, be aggregated in order to represent all the nodes and/or all the suboperations of a step. Preferentially, a new node whose local operation has failed sends an error message to the input node.

According to another particular embodiment, one or every node of the connection path transmits an acknowledgment message to the connection's input node after having completed said local operation, said input node transmitting said other control message after receiving the acknowledgment messages from all the nodes that must perform a local operation corresponding to the step indication field.

According to one embodiment, the input node comprises, for each connection establishment step, a list of the nodes in the connection path that must perform a local operation, which makes it possible to determine whether all of the expected step acknowledgments have been received. According to another embodiment, a step acknowledgment must be received from all of the nodes in the connection path during each step. In such a case, a node is capable of transmitting an acknowledgment after having determined that there are no local operations to perform during the current step.

Advantageously, a node in the connection path may transmit the step acknowledgment after having determined that there is no local operation to perform during the current step.

According to one particular embodiment, in response to receiving the control message, one or every node in the connection path accesses a table of local operations stored within said node in order to determine said local operation that must be performed, based on the step indication field.

Two transmission modes for transmitting the control messages may be conceived for nodes located on the connection path. According to a first transmission mode, a node transmits a control message with the step indication field to the following node as quickly as possible, independent of the progress of the local operation that must be performed by said node. This transmission mode makes it possible to relay the control message to all the nodes in the connection as quickly as possible, in order to quickly initiate the corresponding local operations within the nodes. This transmission mode is particularly suitable for local operations that may be performed at the same time within multiple nodes.

According to a second transmission mode, a node transmits the control message with the step indication field to the following node only when the local operation which must be performed by said node has reached a certain stage of progress, such as being largely finished. This transmission mode makes it possible to sequentially activate the corresponding local operations in node order. This transmission mode is particularly suitable for local operations that must be performed sequentially in node order along the connection path, such as adjusting the power of the optical signal.

When establishing the connection, the best-suited transmission mode may be the first one or the second one, depending on the nature of the current step and the corresponding local operation. According to one preferred embodiment, the nodes select the first or the second control message transmission mode each time, based on the step indication field. For example, the control message's transmission mode may be specified within the node's table of local operations for each value of the step indication field. Within the RSVP-TE protocol, both of these transmission modes may be implemented with the assistance of corresponding adjustments to the timers of already-finished machines.

According to one embodiment, wherein the connection is established using photons and the connection establishment includes a step of adjusting the power of a signal of said photonic connection, said at least one node performs an operation to adjust the power of said signal in response to receiving a control message comprising said step indication field corresponding to said power adjustment step, and transmits said control message with the step indication field to the next node after having completed said power adjustment operation.

This embodiment may be applied to various types of optical signal power-modification devices, particularly variable optical attenuators, narrowband or broadband optical amplifiers (for example SOAs, EDFAs or others), wavelength selective switches, wavelength blockers, and spectrum equalizers.

According to one particular embodiment, the connection establishment comprises a preparation step preceding the power adjustment step, and a termination step following the power adjustment step.

According to one particular embodiment, at least one node in the connection path comprises a power modification device that must be crossed by said optical connection signal, as well as the command unit controlling said power modification device using an automatic regulation procedure, with the local operation corresponding to the preparation step comprising, for said at least one node, disabling said automatic regulation procedure. For example, a re-enabling of said automatic regulation procedure may be carried out during the termination step or at the end of the adjustment step.

Preferentially, the automatic regulation procedure is performed based on a desired predetermined power profile and a feedback signal sensitive to the power of the optical signal actually transmitted downstream of the power modification device.

The method may be applied to any sort of optical network, with or without converting the traffic into electrons within the nodes, with or without multiplexing. According to one preferred embodiment, the optical signal is carried using wavelength division multiplexing (WDM), said desired predetermined power profile comprising a relationship between the respective powers of multiple multiplexed-wavelength channels. According to one preferred embodiment, the connection is established using photons.

According to one embodiment, at least one node of the connection path comprises a broadband optical amplifier that must be crossed by said photon connection signal, with the local operation corresponding to the preparation step including, for said at least one node, setting said broadband optical amplifier to an operating mode compatible with the transitional effects, and the local operation corresponding to the determination step including, for said at least one node, setting said broadband optical amplifier to a normal operating mode intended to stabilize the network.

Preferentially, the control messages are messages of a signaling protocol suitable for reserving the nodes' communication resources along the connection path. For example, the signaling protocol may be chosen from the group comprising RSVP and its extensions.

Various formats may be used to carry the step indication field within these protocols. For example, the step indication field name may be provided within an ADMIN_STATUS object of the RSVP-TE protocol, or within an object dedicated to adjusting the connection.

The invention also provides an optical network element comprising transport resources allocated to a connection so that it can carry a signal of said connection, communication means for exchanging control messages with at least one adjacent node located on a path of said connection, and control means for carrying out the steps consisting in, in response to receiving a control message comprising a step indication field arriving from an input node of the connection, carrying out a local operation corresponding to said step indication field, and transmitting to the connection input node a control message comprising a step acknowledgment after having completed said local operation corresponding to the step indication field.

One idea upon which the invention is based is controlling a connection establishment procedure comprising multiple steps that must be carried out in succession, and particularly one or more signal power adjustment steps, by means of control messages similar to those which are available within the GMPLS protocol stacks, whose deployment within heterogeneous networks is well understood. Another idea upon which the invention is based is using such a control message, particularly of the RSVP-TE protocol or an analogous one, in order to form the basis of a token mechanism ensuring that a particular step is indeed carried out sequentially in the order of the connection's nodes.

The invention will be better understood, and other purposes, details, characteristics, and advantages thereof will become more apparent through reading the following description of multiple particular embodiments of the invention, given only by way of non-limiting examples, with reference to the attached drawings. In these drawings.

Figure 1:
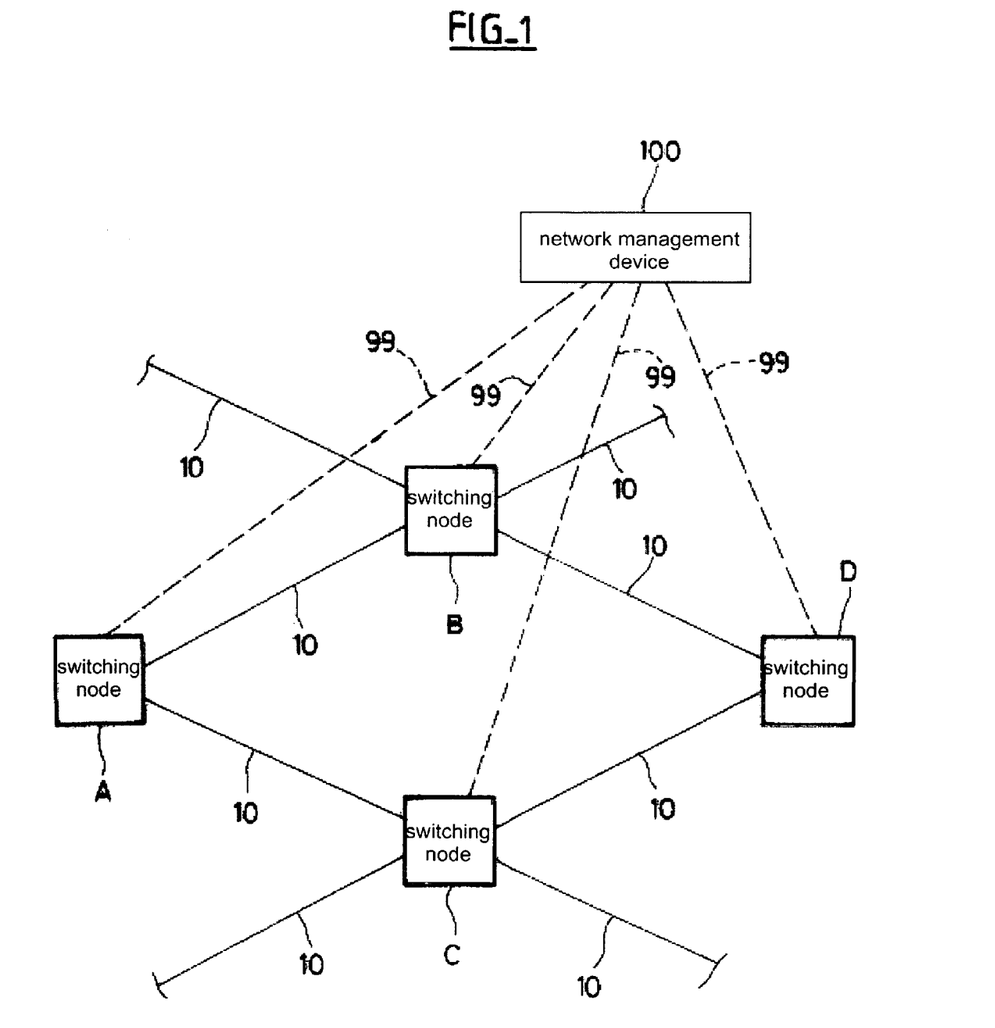
FIG. 1 is a functional schematic depiction of an optical network wherein embodiments of the invention may be implemented.

FIG. 1 very schematically depicts a WDM optical network comprising four switching nodes A, B, C, and D connected by optical links 10. In certain embodiments, a network management device 100 is also provided, but this is not mandatory. The number of nodes and the topology of the network of FIG. 1 are chosen only for illustration purposes, and are not limiting in their nature.

Figure 2:
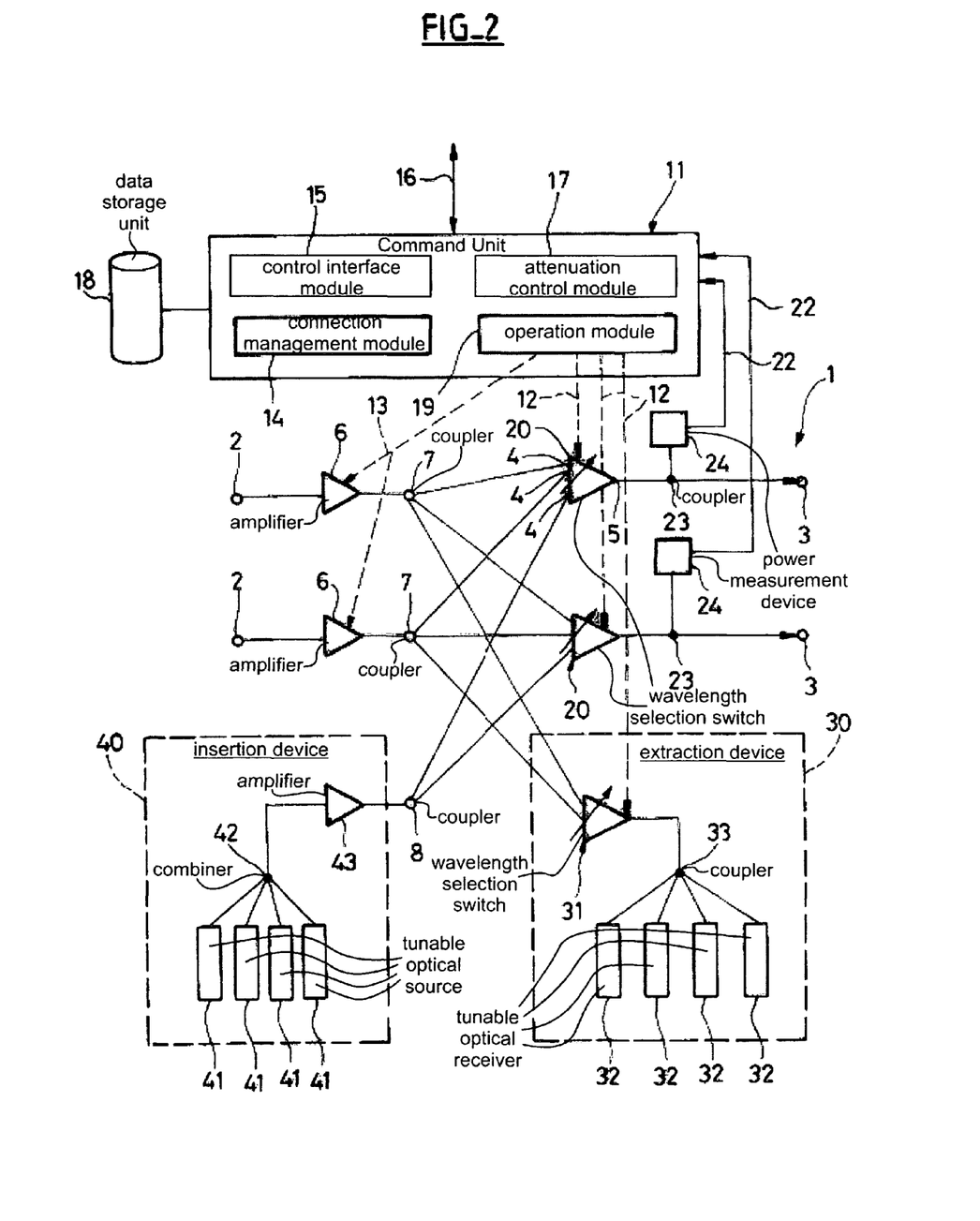
FIG. 2 is a functional schematic depiction of a transparent optical node of the network of FIG. 1.

FIG. 2 schematically depicts the architecture of an optical network 1 that may be used to create the nodes A, B, C, and D. The node 1 has two input ports 2 and two output ports 3, intended to be connected to optical links 10. Here, for illustrative purposes, a transparent broadcast-and-select architecture based on wavelength selective switches 20 (or WSSs) has been chosen. Other, different architectures and degrees of connectivity are also possible.

As a reminder, a wavelength selective switch refers to a piece of equipment that may be used as a reconfigurable multiplexer or a reconfigurable demultiplexer. When it is acting as a multiplex or, as shown in FIG. 2, the selectable ports serve as inputs, and a shared port serves as a common output. The wavelength selection switch is capable of switching wavelength channels received at respective inputs, based selectively on the control signal, to the shared output of that piece of equipment. This piece of equipment thereby carries out a reconfigurable multiplexing function on wavelength channels whose optical frequencies are aligned with one or more predetermined gratings. It makes it possible to provide, at the output, a channel selected from among the channels received at the inputs, or an output multiplex made up of a set of channels selected from among the received channels. At each input port, one channel, multiple channels, or no channel may be sent.

The switching of channels within the wavelength selection switch is produced by spatial light manipulation organs, such as micromirrors activated by MEMS micro-actuators, or liquid crystal cells. In addition to selecting the channels, these organs are capable of adjusting the signal attenuation for each transmitted wavelength channel. In this manner, the node's 1 wavelength selection switches 20 serve to both select the wavelength channels that must be transmitted to the ports 3 and to adjust their output power channel-by-channel. For example, in a WSS based on MEMS, the level of attenuation may be adjusted by modifying the alignment of the reflected beam with respect to an optimal alignment, so as to introduce losses corresponding to a chosen alignment defect or focus defect. The relationship between the position or control voltage of the micro-actuator and the resulting level of attenuation may be calibrated and tabulated within a memory unit of the WSS so that it may be used during operation.

Numerous wavelength selection switch architectures are known in order to fulfill similar functionalities, with a larger or smaller number of ports. FIG. 2 may therefore not be considered limiting in this respect.

From the input ports 2, the incoming WDM signals are amplified by amplifiers 6 and broadcast by ⅓ couplers 7 to both of the WSSs 20 and to an extraction device 30, respectively. Both of the WSSs 20 also have an insertion port connected to an insertion device 40 via a coupler 8.

The extraction device 30 serves to extract traffic from the node 1. It comprises a wavelength selection switch 31 for selecting the channels to be extracted, and adjusting their output power, and a set of tunable optical receivers 32 connected to the output of the WSS 31 by a coupler 33. Other architectures are also possible.

The insertion device 40 serves to extract traffic into the node 1. It comprises a set of modulated tunable optical sources 41, a combiner 42, and an amplifier 43. Other architectures are also possible.

The wavelength selection switches 20 and 31 are controlled by a command unit 11 of the node, via control links 12. The amplifiers 6 are also controlled by the command unit 11 via control links 13. The command unit 11 fulfills multiple functions schematically depicted by functional modules in FIG. 2.

A control interface module 15 receives and emits control messages over control channels 16, connected, for example, to a network management device or to other nodes of the network. The control channels may be transported along the same links as the data, such as along a dedicated wavelength, or along links separated from the data plane, for example along a control network that overlaps the data network.

A connection management module 14 extracts from the control messages information regarding the connections already established, or those which are to be established, deleted, or modified, and keeps a table of the connections up-to-date within a data storage unit 18 of the node 1. The connection table may contain various information about the connections sent by, received by, or passing through the node 1, particularly their origin, destination, traffic characteristics (throughput, quality of service) and allocated transport resources (ports, wavelengths, etc.) The connection management module 14 translates this information into switching instructions for an operation module 19 which is tasked with producing the WSSs' control signals over the links 12 and the amplifiers' control signals over the links 13.

An attenuation control module 17 uses feedback signals 22 that respectively represent the power spectrum of the WDM signal obtained at the output of each of the WSSs 20 in order to implement a procedure to automatically regulate the WSSs. The attenuation control module 17 provides the operation module 19 with attenuation control instructions for adjusting the power of each channel based on a predetermined desired power profile and the actually measured power levels. In order to produce the feedback signals 22, a coupler 23 is placed at the output of each WSS 20 in order to sample a small portion of the output signal and send it to a channel power measurement device 24. The power measurement device 24 measures a power spectrum of the wavelength channels that it receives. The attenuation control module 17 compares this measured spectrum to a desired predetermined power profile, which may, for example, be stored within a memory of the command unit 11. The desired power profile may have various shapes, such as a roughly flat shape corresponding to equal powers for all channels, or a non-flat shape corresponding to a higher power within certain parts of the spectrum and lower power within other parts of the spectrum. A non-flat profile may particularly be chosen to compensate for a curve showing non-uniform increase among EDFA optical amplifiers.

Now we will describe an operation of the network of FIG. 1, in a situation wherein the nodes are created in accordance with FIG. 2, making it possible to establish a connection and adjust the signal within the network's data plane.

The node's "control plane" refers to all of the elements, functionalities, and protocols that participate in controlling the network, particularly the functionalities provided by a GMPLS protocol stack, for example routing, signaling, and traffic engineering. The node's "data plane" refers to all of the elements, functionalities, and protocols that participate in transferring and transporting data. The distinction between the control plane and data plane is a logical distinction which does not necessarily correspond to distinct hardware elements.

The term "transport resource" may encompass various physical elements of the network, depending on the transport technologies that are used. For example, within the optical node 1, transport resources are the wavelengths, the input ports 2, the output ports 3, the optical sources 41, and the optical receivers 32.

With other transport technologies, the resources may also include memory space for queues, CPU time, time intervals for TDM multiplexing, etc.

Figure 3:
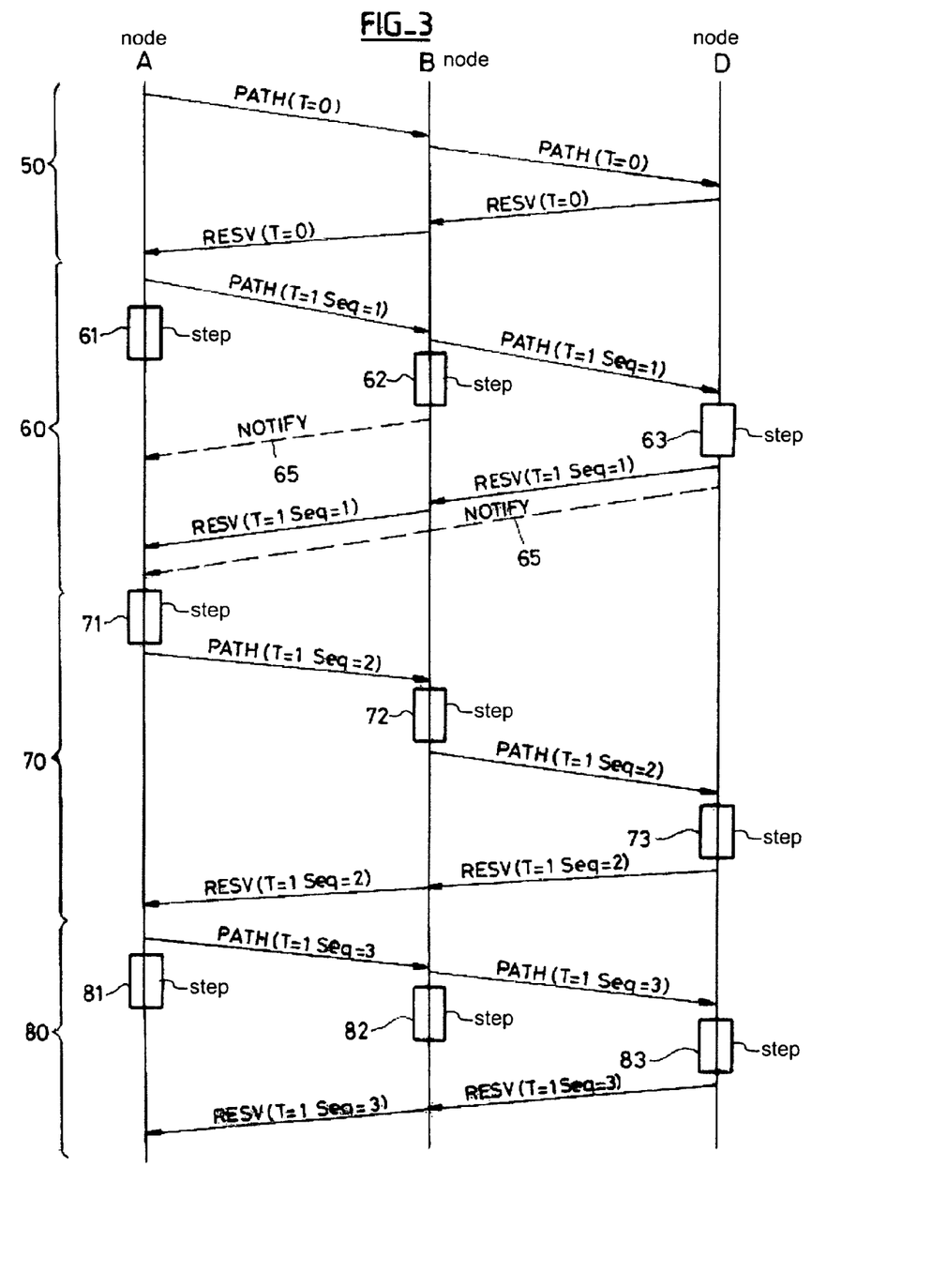
FIG. 3 is a diagram depicting a method for establishing a connection within the network of FIG. 1 according to one embodiment of the invention.

With reference to FIG. 3, it is assumed that the connection to be established consists of a determined wavelength channel λi which must be emitted by the node A, travel transparently through the node B and be received by the node D. The way in which the route and wavelength to be used are determined is not described here. Any known routing and wavelength assignment technique may be used.

Establishing the connection assumes the transmission of the corresponding instructions to the nodes that are involved. Within an embodiment depicted in FIG. 3, which may for example be suitable for a GMPLS control plane network, these instructions are transmitted by signaling messages of the RSVP-TE protocol. In such a case, the nodes' control interface module 15 comprises an RSVP-TE signaling module. The conventions described within the IETF's recommendations may be used, particularly RFC 3473.

Here, it is suggested to use the ADMIN_STATUS Object, as depicted in table 4, to indicate to the nodes the successive steps that must be carried out in order to establish the connection. Compared to RFC 3473, this object is modified in this situation by adding a Seq field intended to carry a current step sequence number when bit T is on. This object is included within all of the PATH and RESV messages depicted.

In the depicted embodiment, the connection establishment procedure comprises four successive steps:

in step 50, PATH and RESV messages are exchanged along the connection using the known technique for reserving the nodes' transport resources in accordance with the characteristics required for the connection, and assigning and distributing the corresponding labels. In this step, the bit T is not enabled, which means that the establishment of the signal within the data plane has not begun. The reservations are only made within the control plane, and the connection tables of nodes A, B, and D are updated concordantly.

step 60 is a signal adjustment preparation step within the data plane, step 70 is a signal power adjustment preparation step within the data plane, step 80 is a signal adjustment termination step within the data plane.

In steps 60, 70, and 80, the bit T is enabled, in order to indicate that the connection test is underway. Additionally, the Seq field is used to carry a current step sequence number, for example Seq=1 for step 60, Seq=2 for step 70 and Seq=3 for step 80. Input node A is the one which controls the following of the steps by emitting, at each step, a PATH message comprising the corresponding sequence number. Additionally, the node 1 expects to receive an acknowledgment from nodes B and D before initiating the following step.

For example, a sequence of signaling messages illustrated in FIG. 3 may be used to control the connection establishment procedure. In FIG. 3, the arrows between nodes A, B, and D represent signaling messages, and the blocks located next to the nodes represent local operations carried out by the nodes.

For each value of the Seq field, each node carries out one or more specific local operations. These operations may, for example, be defined by a table of a local operations stored within the node's data storage unit 18. Table 1 gives an example of the contents of such table, which is suitable for nodes that correspond to FIG. 2.

Step 60 involves preparing the components of the data plane involved in the connection to be transported λi without disrupting the already-established traffic. As the WSSs 20 are, in this situation, subject to an automatic regulation procedure intended to balance out the powers of the various channels, this procedure must be disabled during the phase of turning on the new channel. Otherwise, the increase in the new channel's power could lead to unstable transitional changes made to the other channels by the WSS, which would cause transmission errors in the already-established traffic. Step 60 may also be used to free up devices, such as a measuring device 24, whose usage will temporarily be dedicated to the new channel during the adjustment step 70.

Furthermore, certain components located along the connection path, particularly the amplifiers 6, operate normally in a mode intended to stabilize the state of the network. This operating mode is generally not compatible with voluntary actions that cause substantial changes to the signals within the network. Thus, it is preferable to switch these components, particularly the amplifiers, to an operating mode compatible with the transitional effect during the transitional activation phase of the wavelength channel λi in order to avoid subjecting the signals of already-established connections to instabilities.

This step 60 may be carried out at the same time within all nodes of the connection. It has therefore been decided to initiate it using a PATH Message which is immediately retransmitted by node B to node D.

In step 70, the nodes actually began allowing the new connection's optical signal through, by way of the WSSs 20 (nodes A and B) or WSS 31 (node D). To do so, within every new node, the optical signal's power level is set by adjusting the attenuation that the WSSs 20 and 31 apply to the channel λi. This attenuation is initially set to meet a baseline power level. This power level may be controlled by the command unit 11 with the assistance of the power measurement device 24. Next, the command unit 11 reactivates the automatic attenuation regulation within the corresponding WSS. Step 70 must be carried out sequentially, in node order. This is because automatic attenuation regulation within the WSS based on a feedback loop can only reliably converge if the optical signal is roughly stable at the node's input. Therefore, the signal's power must be roughly stabilized within the preceding nodes before a node can reactivate this control loop. It has therefore been decided to initiate step 70 using a PATH message which is retransmitted by one node to the next node only after the sending node has completed the corresponding operations.

Step 80 consists in resetting the amplifiers to a normal operating mode. As with step 60, this step may be carried out at the same time within all of the connection's nodes. It has therefore been decided to initiate it using a PATH Message which is immediately retransmitted by node B to node D.

At each step, the input node A expects to receive acknowledgment information from all of the connection's nodes before initiating the following step. Here, acknowledgment information refers to information indicating that the node has successfully completed the local operations corresponding to the current step. In the embodiment depicted in FIG. 3, this acknowledgment information consists of an RESV message bearing the same step indicators as the PATH message to which it is responding. However, this simple convention is only one possible choice among several. At each step, the output node D transmits the RESV message to node B once the local operations corresponding to the current step have been completed. Node B retransmits this message to node A once the local operations corresponding to the current step have been completed, or, if the operations had been completed beforehand, once the RESV message has been received. FIG. 3 depicts the second situation.

In one variant, the acknowledgment information may be separately transmitted to the input node A by every node once the corresponding operations have been completed. To do so, within the RSVP-TE protocol, a NOTIFY message may be used, as shown by the dashed arrows 65. Although this variant is only depicted it in step 60 in FIG. 3, it may be used in any one of the steps, or in several of them.

As shown in the third column of table 1, one possibility for indicating to the nodes the conditions under which the PATH control message must be transmitted to the next node during each step is to place this information within the local operation table. In one variant, this information may be placed within another data structure.

In this embodiment based on the RSVP-TE Protocol, it may be seen that a single protocol is used at the same time for reserving connection resources, managing quality of service, and controlling the signal's establishment sequence within the data plane. The result is a simpler deployment of the network's control plane, particularly in the form of a GMPLS protocol stack, and easier adaptation to heterogeneous technologies. In one variant embodiment, the operations of reserving resources within the control plane may be carried out during step 60 and not during a previous step, which makes it possible to reduce the number of control message exchanges.

In the example shown in FIG. 3, the current step indication is given to the nodes by combining the T and Seq fields of the ADMIN_STATUS object. This choice of fields is given by way of example, and other conventions may apply to it. In one embodiment, this information is carried within a new object, which may for example be denoted TEST_SPEC, within the PATH and RESV messages of the RSVP-TE protocol, as depicted in tables 2 and 3. In addition to one or more step indication fields, this object may include fields for various information about the current step, such as a sequence number, a hierarchical sequence number for identifying steps and substeps within a single step, a step descriptor, a substep descriptor, etc. The object's name and its position within the message are purely illustrative in tables 2 and 3. Other conventions are possible. In one embodiment, this object is used to specify the semantics of the bit T of the ADMIN_STATUS object, it is therefore only taken into account by the nodes if the T bit is on.

The connection establishment procedure described in FIG. 3 is purely illustrative and non-limiting. The message exchanges described above may be adjusted to control various connection establishment or removal procedures with a larger or smaller number of steps and/or local operations different from the ones described above. Furthermore, FIG. 3 does not exhaustively describe the signaling message exchanges between nodes A, B, and D. More signaling messages may be exchanged between the nodes during this procedure, such as in order to comply with the transmission paces imposed by signaling protocol timers and/or to fulfill other functions, such as refreshing connections. For example, during the period between the beginning of step 62 and the end of step 72, node B may transmit one or more PATH messages to node D in order to regularly inform it of the procedure's current status. In this example, the parameter Seq=1 is transmitted during this period.

The use of the RSVP-TE protocol is not the only way of coordinating the establishment of the connection by the nodes. Other signaling or network management protocols may also be used.

The description of the command unit 11 given above is not exhaustive. The command unit may comprise other functions and modules, such as for operating and configuring optical transponders, optical receivers, and other active node elements. In one particular embodiment, it includes a GMPLS protocol stack. Furthermore, although only one command unit has been depicted, it is clear that the functions described may be distributed among multiple circuits, such as in the form of a high-level controller for the node and multiple low-level controllers each dedicated to a WSS.

The embodiments described above may easily be adapted to other node architectures, other types of signals, other switching techniques (particularly for conversion to electrons), and other power modification devices. For example, document EP1161115 describes an optical node architecture wherein power adjustment is carried out by variable optical attenuators or by amplifiers.

Some of the elements depicted, particularly the control units and the various modules, may be constructed in various forms, in a stand-alone or distributed fashion, using hardware and/or software components. Hardware components that may be used are special ASIC integrated circuits, FPGA programmable logic networks, or microprocessors. Software components may be written in various programming languages, such as C, C++, Java, or VHDL. This list is not exhaustive.

A network management device may be a hardware device, such as a microcomputer, a workstation, a device connected to the Internet, or any other dedicated or general-purpose communication device. Software programs run by this device fulfill network management functions for controlling network elements.

Although the invention has been described in connection with multiple particular embodiments, it is naturally not limited thereto in any fashion, and naturally comprises all technical equivalents of the means described, as well as their combinations, should such combinations fall within the scope of the invention.

The use of the verbs "comprise" and "include", and the conjugated forms thereof, does not rule out the presence of other elements or steps besides those described in a claim. The use of the indefinite article "a" or "an" for an element or step does not rule out the presence of a plurality of such elements or steps, unless otherwise stated. Multiple means or modules may be represented by a single hardware element.

Within the claims, no reference symbol in parentheses should be interpreted as a limitation on the claim.

TABLE 1

Example local operation table

| Value of the Seq field | List of local operations | PATH message transmission mode |
|---|---|---|
| 1 | Identifying the WSS involved in the connection<br>disabling the WSS's automatic regulation<br>setting the attenuation of the new channel within the WSS to the maximum level<br>identifying the amplifier involved in the connection<br>setting the amplifier to an operating mode compatible with the transitional effects | Immediate |
| 2 | Setting the attenuation of the new channel within the WSS to a baseline level<br>re-enabling the WSS's automatic regulation | After completing the operations |
| 3 | Setting the amplifier to a normal operating mode | Immediate |

TABLE 2

PATH message format example

```
<Path Message> ::= <Common Header> [ <INTEGRITY> ]
    [ [<MESSAGE_ID_ACK> | <MESSAGE_ID_NACK>] ... ]
    [ <MESSAGE_ID> ]
    <SESSION> <RSVP_HOP>
    <TIME_VALUES>
    [ <EXPLICIT_ROUTE> ]
    <LABEL_REQUEST>
    [ <PROTECTION> ]
    [ <LABEL_SET> ... ]
    [ <SESSION_ATTRIBUTE> ]
    [ <NOTIFY_REQUEST> ... ]
    [ <ADMIN_STATUS> ][ <TEST_SPEC>]
    [ <ASSOCIATION> ... ]
    [ <PRIMARY_PATH_ROUTE> ... ]
    [ <POLICY_DATA> ... ]
    <sender descriptor>
```

TABLE 3

RESV message format example

```
<Resv Message> ::= <Common Header> [ <INTEGRITY> ]
    [ [<MESSAGE_ID_ACK> | <MESSAGE_ID_NACK>] ... ]
    [ <MESSAGE_ID> ]
    <SESSION> <RSVP_HOP>
    <TIME_VALUES>
    [ <RESV_CONFIRM> ] [ <SCOPE> ]
    [ <PROTECTION> ]
    [ <NOTIFY_REQUEST> ]
    [ <ADMIN_STATUS> ] [<TEST_SPEC>]
    [ <POLICY_DATA> ... ]
    <STYLE> <flow descriptor list>
```

TABLE 4

ADMIN_STATUS object message format example

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Length          |   Class-Num(196) |   C-Type (1)   |
+-+-+-+-+-+-+-+-+-+-+-+-+-+-+-+-+-+-+-+-+-+-+-+-+-+-+-+-+-+-+-+-+
|R|             Reserved                  |  Seq  |T|A|D|
+-+-+-+-+-+-+-+-+-+-+-+-+-+-+-+-+-+-+-+-+-+-+-+-+-+-+-+-+-+-+-+-+
```

We claim:

1. A method for controlling an establishment of a connection within an optical network said method comprising the steps of:
    transmitting a control message node-to-node along a path of said connection from an input node to an output node of the connection, said control message comprising a step indication field to indicate a current step of the connection establishment;
    performing a local operation that corresponds to said step indication field within at least one node along the path of the connection in response to receiving said control message;
    transmitting a step acknowledgment from said at least one node to said input node of the connection after completion of said local operation that corresponds to said step indication field; and
    in response to a reception of said acknowledgment from said at least one node, transmitting another control message node-to-node along the path of said connection from said input node to said output node of said connection, wherein said step indication field indicates a next step within said sequence of steps as the current step of the connection establishment;
    wherein said connection is established in a photonic domain and said connection establishment comprises the steps of:
    adjusting power of a signal of said optical connection, said at least one node being operable to perform an operation to adjust said power of said signal in response to reception of said control message comprising said step indication field that corresponds to said power adjustment step; and
    transmitting said control message with said step indication field to a next node after completion of said power adjustment operation.

2. A method according to claim 1, further comprising the step of transmitting, via an output node of said connection, the step acknowledgment within said control message that must be transmitted node-to-node along the path of said connection to said input node, said control message comprising said step indication field to which the step acknowledgment corresponds,
    each node along said path of said connection being operable to transmit said control message to the following node after completion of said local operation that corresponds to the step indication field.

3. A method according to claim 1, further comprising the step of transmitting, via a node of said connection path, an acknowledgment message to said input node of said connection after completion of said local operation,
    said input node being operable to transmit said another control message after reception of said acknowledgment messages from all of the nodes that must perform a local operation that corresponds to the step indication field.

4. A method according to claim 1, further comprising the step of transmitting, via a node in said connection path, the step acknowledgment after having determined that there is no local operation to perform during the current step.

5. A method according to claim 1, further comprising the step of accessing, via one or every node in the connection path in response to said reception of said control message, a table of local operations stored within said node in order to determine said local operation that must be performed, based on the step indication field.

6. A method according to claim 1, wherein said connection establishment comprises a preparation step that precedes said power adjustment step, and a termination step that follows said power adjustment step.

7. A method according to claim 6, wherein at least one node of said connection path comprises a power modification device that must be crossed by said signal of said optical connection, and wherein a command unit that controls said power modification device uses an automatic regulation procedure, with said local operation that corresponds to said preparation step further comprising the step of, for said at least one node, disabling said automatic regulation procedure.

8. A method according to claim 1, wherein said control messages are messages of a signaling protocol suitable to reserve the communication resources of said nodes along said connection path.

9. A method according to claim 8, wherein said signaling protocol is chosen from the group comprising RSVP and its extensions.

10. A method according to claim 9, further comprising the step of providing said step indication field within an ADMIN_STATUS object of a RSVP-TE protocol.

11. A method according to claim 9, further comprising the step of providing said step indication field within an object dedicated to adjusting said connection.

12. An optical network element comprising:

Data storage unit storing transport resources allocated to a connection that enables said optical network element to carry a signal of said connection;

Communication means configured to exchange control message with at least one adjacent node located on a path of said connection; and Control means configured to: Upon receiving a control message that comprises a step indication field that arrives from an input node of said connection, carry out a local operation that corresponds to said step indication field; and transmit a control message to said input node of said connection that comprises a step acknowledgment after completion of said local operation that corresponds to said step indication field; wherein said connection is established in a photonic domain and an establishment of said connection comprises: a power adjustment of a signal of said optical connection, at least one node being configured to perform an operation to adjust said power of said signal in response to said reception of said control message comprising said step indication field that corresponds to said power adjustment; and a transmission of said control message with said step indication field to a next node after completion of said power adjustment operation.

* * * * *